J. A. BOSTWICK.

Assignor to E. M. LANG & Co.

Soldering Iron.

No. 8,466. Reissued Oct. 29, 1878.

Witnesses:

George W. Miatt

James E. Kearney

Inventor:

J. A. Bostwick

By David A. Burr

Atty.

N. PETERS, PHOTO-LITHOGRAPHER, WASHINGTON, D. C.

UNITED STATES PATENT OFFICE.

JABEZ A. BOSTWICK, OF NEW YORK, N. Y., ASSIGNOR TO E. M. LANG & CO., OF PORTLAND, MAINE.

IMPROVEMENT IN SOLDERING-IRONS.

Specification forming part of Letters Patent No. 104,412, dated June 21, 1870; Reissue No. 8,466, dated October 29, 1878; application filed September 3, 1878.

*To all whom it may concern:*

Be it known that I, JABEZ A. BOSTWICK, of the city, county, and State of New York, have invented a new and useful Improvement in Soldering-Irons, of which the following is a specification, reference being had to the accompanying drawings, in which—

Figure 2:
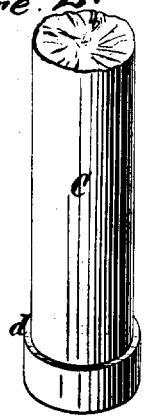
Figure 1:
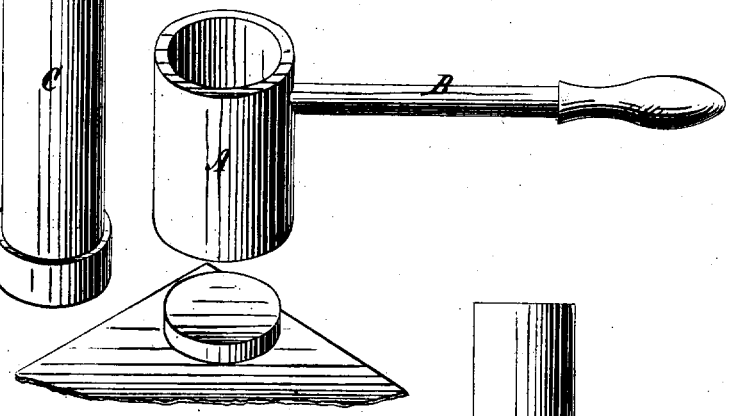
Figure 3:
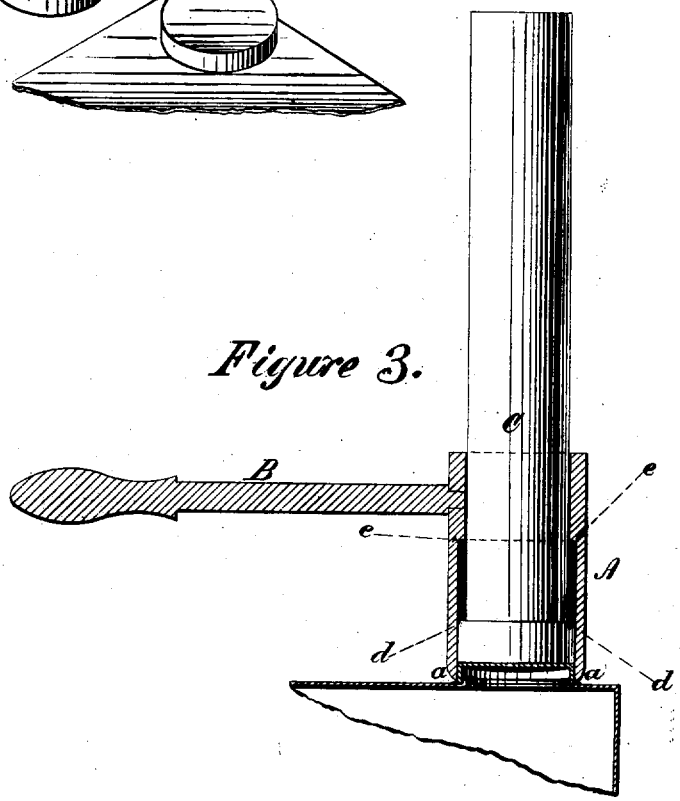

Figure 1 is a view in perspective of my improved soldering-iron and of a cap placed upon a metallic can to be soldered. Fig. 2 is an elevation of the guiding or pivotal presser-rod; and Fig. 3 is a sectional view of the soldering-iron, placed upon the cap so as to solder the same, with the pivotal presser-rod in place to hold down the cap and guide the iron in its operation.

My invention relates to the construction of a tool for soldering the caps upon the tops of metallic cans which will admit of more easy and expeditious manipulation in performing the operation than the tools heretofore employed for this purpose.

It consists in the combination of an iron adapted to produce, when heated, a proper flow of solder along the joint of a can-cap, with a central rod about which it may revolve, and which will serve the twofold purpose, first, of a pivot to limit and guide the soldering-iron in its proper movement during the process of soldering; and, second, of a weight to press and hold down the cap during the operation and until it is fixed and retained by the solder.

In the accompanying drawing, A is a soldering-iron consisting of a ring or cylinder of metal made thick to retain heat, and provided with a lower edge or face, *a*, beveled, and adapted to rest upon and follow the joint to be soldered, and to produce a proper flow of solder in and upon the same. This soldering-edge *a* may be continuous and annular to embrace the cap, or it may form merely the arc of a circle, or be otherwise broken away to bear upon the joint at one or two points thereof, instead of continuously. The iron is provided with a handle, B, for removing it from can to can or to and from the furnace, and by means whereof its movement about its central pivot-rod and along the joint to be soldered is effected. This handle is guarded, as usual, with wood or other non-conductor of heat.

C is a rod, made heavy to serve as a weight to retain the cap in place while being soldered. Its upper end is of such diameter as to fit loosely within the upper annular portion or collar of the soldering-iron, and its lower end is enlarged to form a shoulder, *d*, which, when the rod is lifted, shall engage the counterpart projection *e* formed by the collar of the iron A.

In the operation of soldering with this tool, the weight or presser-rod C is placed centrally upon the cap which is to be secured, and the iron B, properly heated, is slipped over the rod, and, being brought thereby to bear upon the joint, is quickly turned or revolved about the rod as a pivot, so as to melt the solder at the joint and flow it to every part of the seam. So soon as this is accomplished the iron is lifted off from the presser-rod C, and either slipped over a second rod placed ready in position upon the next can, or, if necessary, is reheated for the purpose. In the meantime the presser-rod, remaining as a weight upon the can-cap which has been operated upon, will retain it in position until the solder of the joint is set and the cap thereby secured. The process of soldering may thus be very rapidly and effectively carried on without the need of a skilled workman.

The central rod thus serves not only as a guide to conduct the heated iron directly to the joint, but also as a pivot to determine and facilitate its ready movement along the joint, and as a loose weight to hold the cap in place until it is secured by the cooling of the solder.

If the presser-rod C be lifted instead of the soldering-iron proper, the shoulder *d* on the rod, engaging the offset *e* of the collar within the iron, will serve to take up the latter, so that it may be thereby transferred to another can-cap. A number of cans may be in this manner soldered at one heat of the iron with but one presser-rod; but in such case the operator must first, after lifting the iron from the joint, pause a moment to allow the joint to set before lifting the rod itself from the can.

I claim as my invention—

1. A tool for soldering the caps on cans, consisting of a soldering-iron revolving about a central pivotal rod, which is made to rest upon and steady the cap during the operation of soldering.

2. The combination of a hollow iron for soldering caps on cans with a separate and inclosed weight for steadying the cap on the can during the operation of soldering.

J. A. BOSTWICK.

Witnesses:
JAS. W. HALL,
DAVID A. BURR.